(12) United States Patent  (10) Patent No.: US 11,866,272 B2
Ikeya et al.  (45) Date of Patent: Jan. 9, 2024

(54) HOLDING DEVICE, TRANSFER SYSTEM, SUPPORT DEVICE, PLACEMENT METHOD, AND TRANSFER METHOD

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Yukihiro Ikeya, Yokohama (JP); Takeshi Toyoshima, Yokohama (JP); Taketo Shiba, Yokohama (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 268 days.

(21) Appl. No.: 17/176,360

(22) Filed: Feb. 16, 2021

(65) Prior Publication Data
US 2021/0253368 A1  Aug. 19, 2021

(30) Foreign Application Priority Data

Feb. 18, 2020 (JP) .................................. 2020-025269

(51) Int. Cl.
*B65G 47/91* (2006.01)
*B65G 43/00* (2006.01)
*B65G 47/46* (2006.01)

(52) U.S. Cl.
CPC ........... *B65G 47/914* (2013.01); *B65G 43/00* (2013.01); *B65G 47/46* (2013.01); *B65G 2203/0233* (2013.01)

(58) Field of Classification Search
CPC ...... B65G 47/914; B65G 47/46; B65G 43/00; B65G 2203/0233
See application file for complete search history.

(56) References Cited

U.S. PATENT DOCUMENTS

| 5,169,284 A * | 12/1992 | Berger ................... B65G 61/00 414/792.9 |
| 5,232,332 A * | 8/1993 | Focke .................... B65G 61/00 414/744.8 |
| 11,161,702 B2 * | 11/2021 | Oshikawa .............. B65G 59/04 |
| 2011/0268548 A1 * | 11/2011 | Doll ......................... B25J 15/00 414/688 |

(Continued)

FOREIGN PATENT DOCUMENTS

GB 2 231 020 A 11/1990
JP 3-88624 A 4/1991

(Continued)

*Primary Examiner* — Gerald McClain
(74) *Attorney, Agent, or Firm* — Oblon, McClelland, Maier & Neustadt, L.L.P.

(57) ABSTRACT

A holding device includes a supporter, a gripper, and a first driver. The supporter supports a weight of a workpiece in a first direction. The gripper includes a gripping surface that grips the workpiece in a second direction crossing the first direction. The first driver moves the supporter with respect to the gripper in the second direction. A tilt of the supporter is changeable with respect to the gripping surface along a plane including the first and second directions.

18 Claims, 15 Drawing Sheets

(56) References Cited

U.S. PATENT DOCUMENTS

2020/0316787 A1    10/2020   Fujihara et al.
2022/0288793 A1*    9/2022   Yamane ................. B25J 19/023

FOREIGN PATENT DOCUMENTS

| JP | 11-123687 A | 5/1999 |
| JP | 2018-89719 A | 6/2018 |
| JP | 2018-176313 A | 11/2018 |
| JP | 2019-111615 A | 7/2019 |

* cited by examiner

HOLDING DEVICE, TRANSFER SYSTEM, SUPPORT DEVICE, PLACEMENT METHOD, AND TRANSFER METHOD

CROSS-REFERENCE TO RELATED APPLICATIONS

This application is based upon and claims the benefit of priority from Japanese Patent Application No. 2020-025269, filed on Feb. 18, 2020; the entire contents of which are incorporated herein by reference.

FIELD

Embodiments described herein relate generally to a holding device, a transfer system, a support device, a placement method, and a transfer method.

BACKGROUND

There is a holding device that holds a workpiece. Technology that can reduce the likelihood of damaging the workpiece when the holding device places the workpiece is desirable.

DETAILED DESCRIPTION

Figure 1:
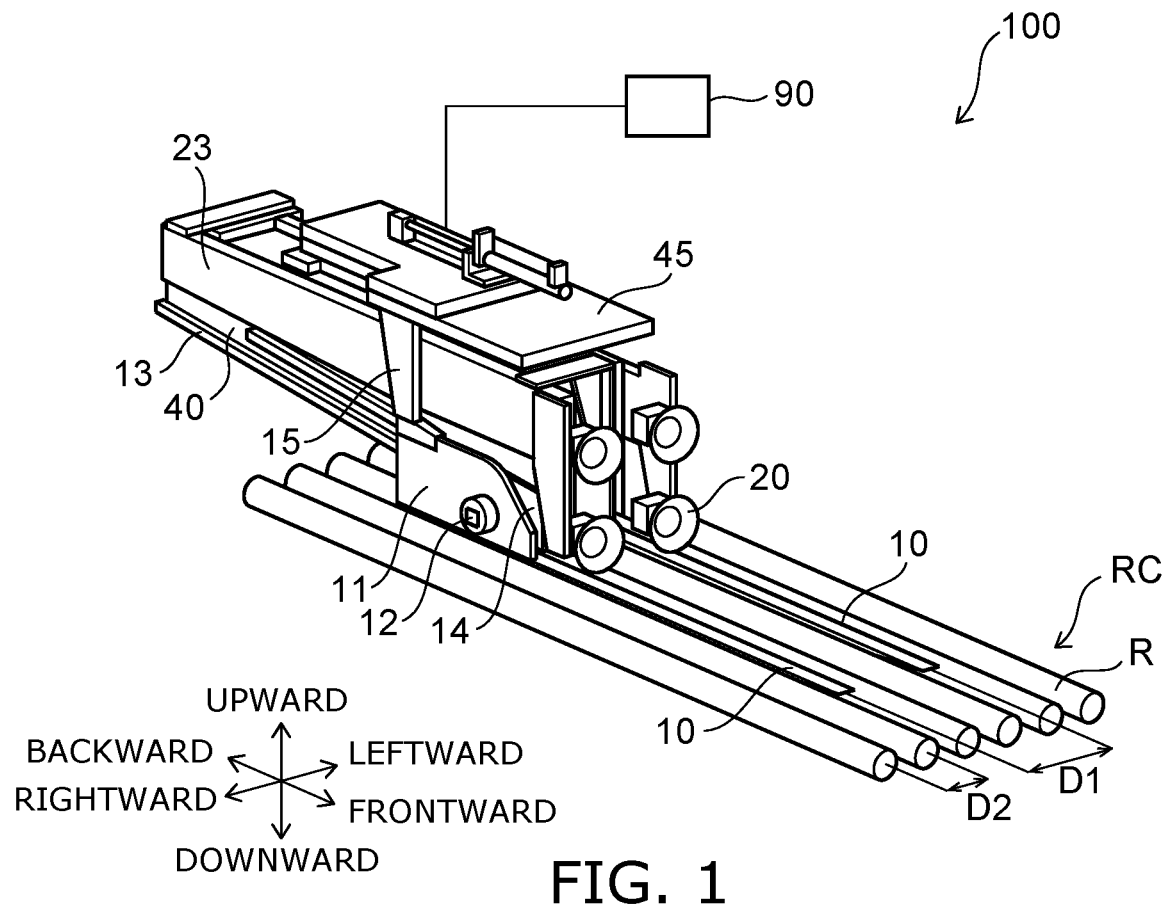
FIG. 1 is a perspective view illustrating a holding device according to an embodiment.

According to one embodiment, a holding device includes a supporter, a gripper, and a first driver. The supporter supports a weight of a workpiece in a first direction. The gripper includes a gripping surface that grips the workpiece in a second direction crossing the first direction. The first driver moves the supporter with respect to the gripper in the second direction. A tilt of the supporter is changeable with respect to the gripping surface along a plane including the first and second directions.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

Figure 2:
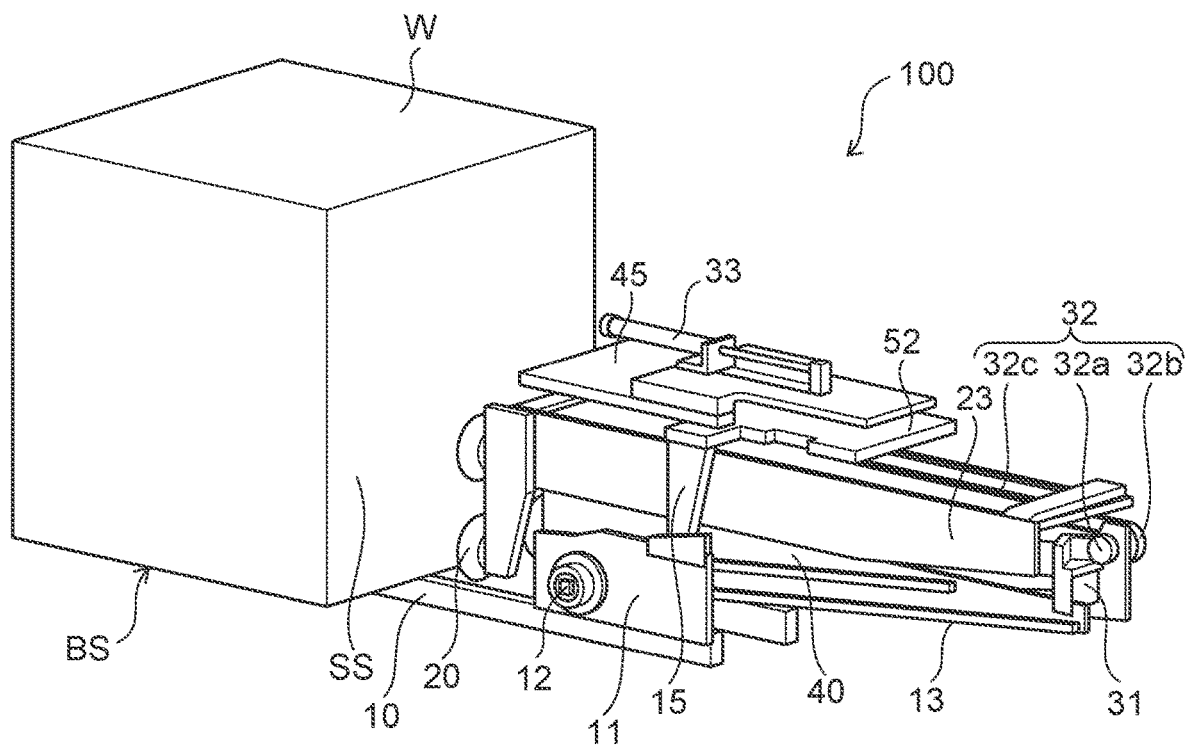
FIG. 2 is a perspective view illustrating the holding device according to the embodiment.
Figure 8:
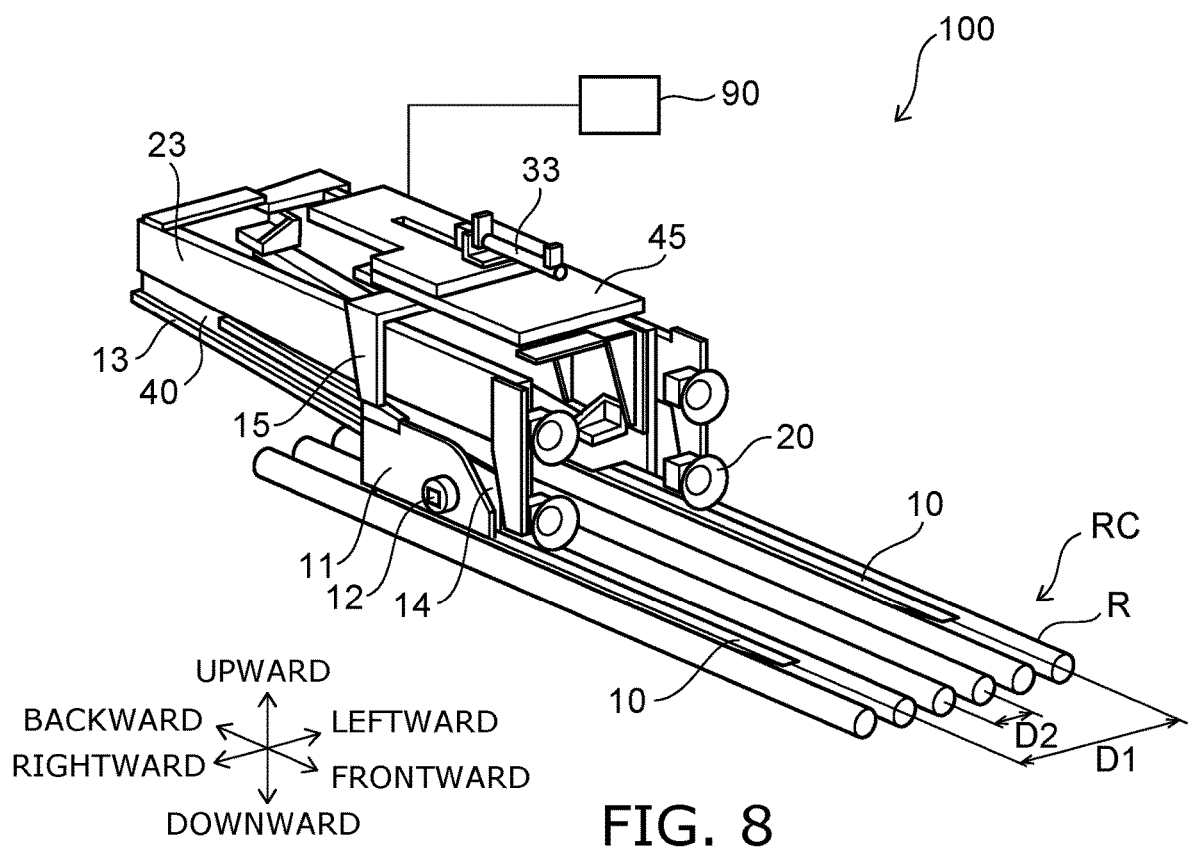
FIG. 8 is a perspective view illustrating the holding device according to the embodiment.

FIGS. 1, 2, and 8 are perspective views illustrating a holding device according to an embodiment.

Figure 3:
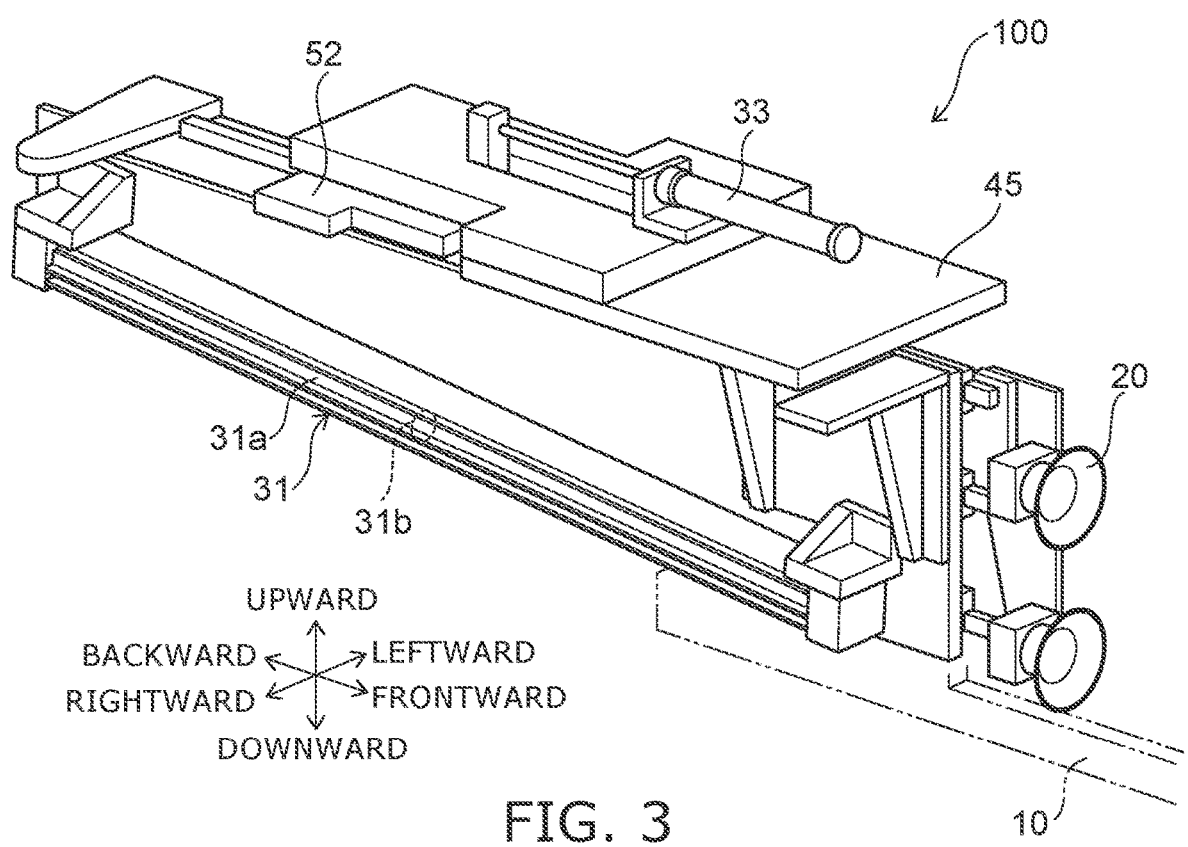
FIG. 3 is a perspective cross-sectional view illustrating the holding device according to the embodiment.

FIG. 3 is a perspective cross-sectional view illustrating the holding device according to the embodiment.

Figure 4:
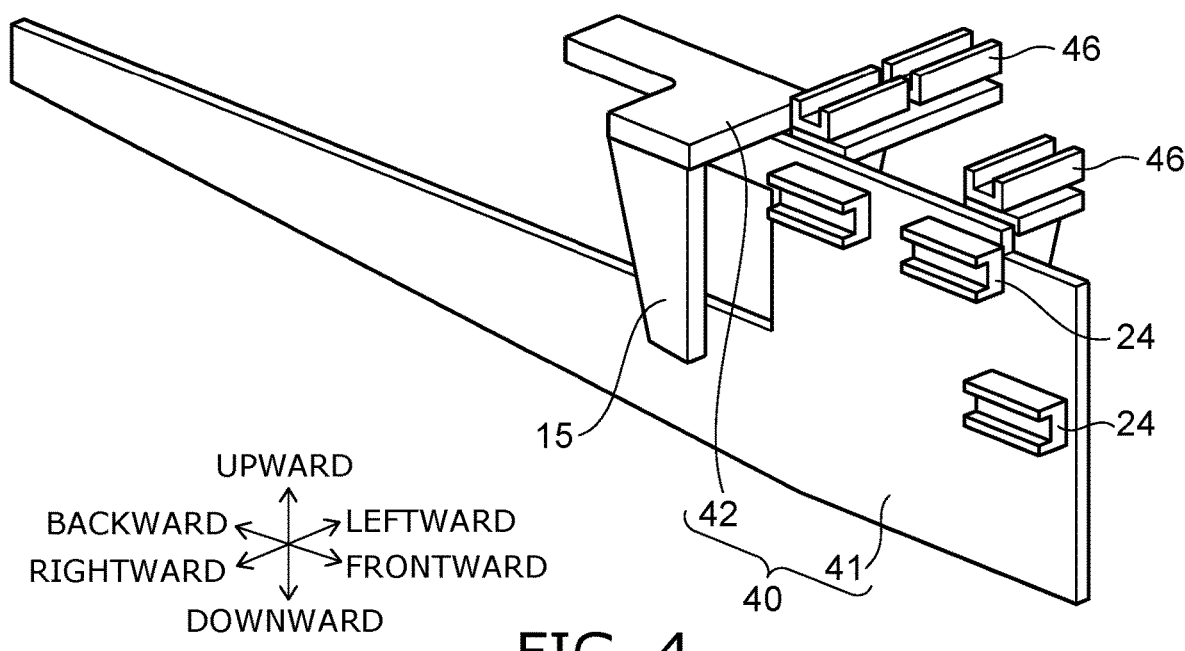
FIG. 4 is a perspective view illustrating a portion of the holding device according to the embodiment.
Figure 6:
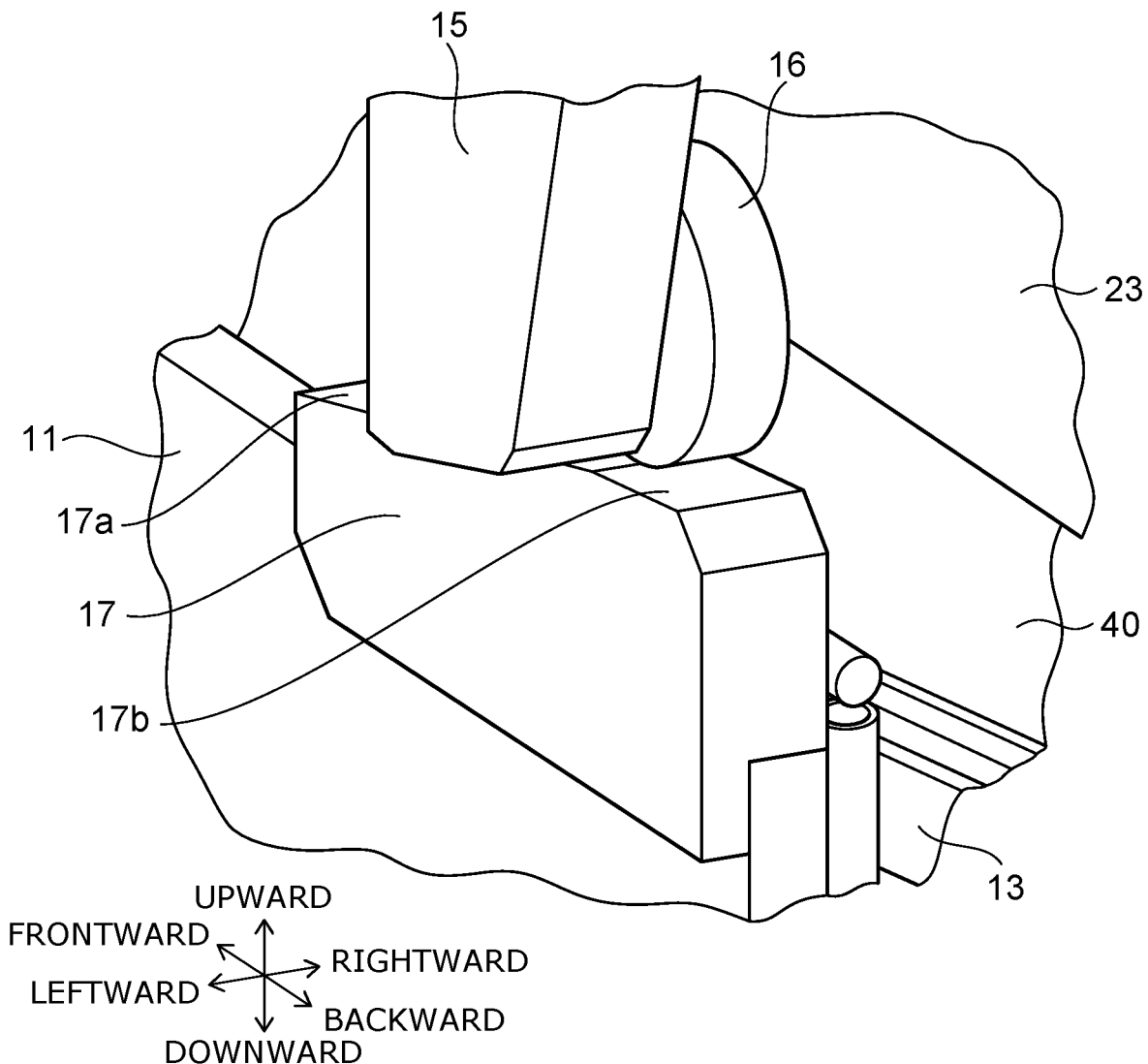
FIG. 6 is a perspective view illustrating a portion of the holding device according to the embodiment.

FIGS. 4 and 6 are perspective views illustrating a portion of the holding device according to the embodiment.

FIGS. 5A to 5C, 7A, and 7B are side views illustrating the holding device according to the embodiment.

Figure 9A:
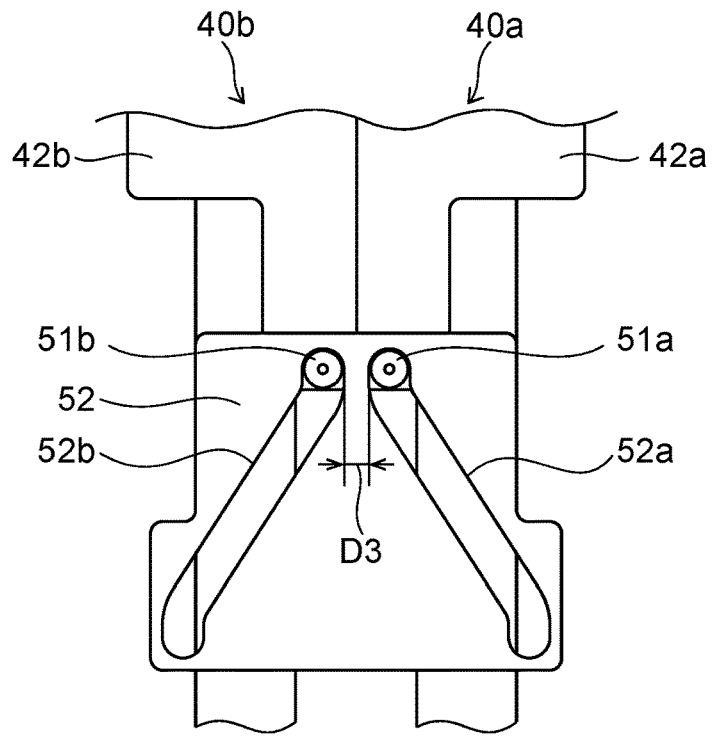
FIGS. 9A and 9B are plan views illustrating a portion of the holding device according to the embodiment.
Figure 9B:
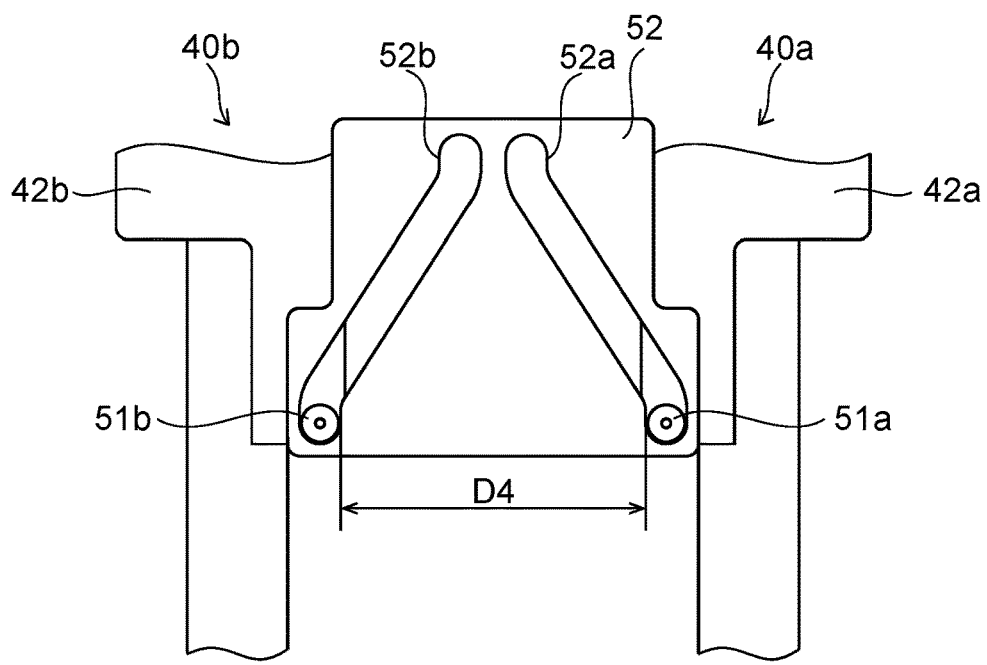

FIGS. 9A and 9B are plan views illustrating a portion of the holding device according to the embodiment.

The holding device 100 according to the embodiment illustrated in FIGS. 1 to 9B includes a supporter 10, a gripper 20, and a first driver 31.

The holding device 100 is used to hold a workpiece W. For example, the workpiece W can be transferred from one location to another location by moving the holding device 100 that holds the workpiece W.

The supporter 10 supports the weight of the workpiece W in a first direction. The gripper 20 grips the workpiece W in a second direction crossing the first direction. The first direction crosses the horizontal plane. The second direction crosses the direction of gravity.

The workpiece W is, for example, a corrugated fiberboard in which an article is packaged. The type, shape, size, etc., of the workpiece W are arbitrary as long as the workpiece W can be supported by the supporter 10 and gripped by the gripper 20.

In the description hereinafter, the first direction is called the vertical direction; and the second direction is called the longitudinal direction. A third direction that crosses a plane including the first and second directions is called the lateral direction. In the state in which the workpiece W is held, the direction from the supporter 10 toward the workpiece W is called upward; and the reverse direction is called downward. The direction from the gripper 20 toward the workpiece W is called frontward; and the reverse direction is called backward. Rightward and leftward are referenced to the vertical and longitudinal directions.

As long as the holding device 100 can hold the workpiece W, the first direction may be tilted with respect to the vertical direction; and the second direction and the third direction may be tilted with respect to the horizontal plane. In the description hereinbelow, the first direction is parallel to the vertical direction; and the second direction and the third direction are parallel to the horizontal plane.

The supporter 10 extends in the longitudinal direction. The thickness in the vertical direction of the supporter 10 is sufficiently small compared to the length in the longitudinal direction of the supporter 10. As illustrated in FIG. 2, the supporter 10 includes a flat upper surface and contacts a bottom surface BS of the workpiece W. The gripper 20 vacuum-grips a side surface SS of the workpiece W.

FIGS. 1 and 2 illustrate the state of the holding device 100 when the workpiece W is held by the supporter 10 and the gripper 20. The gripper 20 is positioned higher than the supporter 10 when holding the workpiece W. In the illustrated example, when holding the workpiece W, the supporter 10 extends frontward from the bottom portion of the holding device 100; and the gripper 20 is positioned at the front surface of the holding device 100.

The first driver 31 moves the supporter 10 in the longitudinal direction with respect to the gripper 20. The movement direction of the supporter 10 may not be parallel to the longitudinal direction, and may be tilted in the vertical direction with respect to the longitudinal direction. Hereinafter, "tilt" or "tilted" means a tilt or tilting along a vertical plane including the longitudinal and vertical directions unless otherwise indicated.

The trajectory when the supporter 10 is moved may not be linear, and may be curved. It is sufficient for the position in the longitudinal direction of the supporter 10 to be changed by the first driver 31; and the position in the vertical direction of the supporter 10 may change when moving.

The supporter 10 is fixed with respect to a rotation part 11. The rotation part 11 is located at the side surface of the holding device 100. The rotation part 11 is mounted to a sliding part 14 via a rotation axis 12. Therefore, the rotation part 11 is rotatable with respect to the sliding part 14. The rotation axis 12 is rotatable around the lateral axis. The rotation part 11 changes the tilt of the supporter 10 with respect to the longitudinal direction by rotating around the rotation axis 12.

The first driver 31 moves the sliding part 14 in the longitudinal direction. The rotation part 11 and the supporter 10 also are moved in the longitudinal direction by the movement of the sliding part 14. The supporter 10, the rotation part 11, and the sliding part 14 are moved by the first driver 31 in the longitudinal direction with respect to the gripper 20 and a frame 40.

The movement of the sliding part 14 is guided by a guide 13. For example, the guide 13 is a protrusion provided at the side surface of the frame 40. The sliding part 14 includes a not-illustrated groove and engages the guide 13. The supporter 10 is mounted to the frame 40 via the rotation part 11, the rotation axis 12, the guide 13, and the sliding part 14.

The guide 13 extends in a direction that is slightly tilted with respect to the longitudinal direction. The sliding part 14, the rotation part 11, and the supporter 10 move along the guide 13 in a direction that is tilted with respect to the longitudinal direction.

For example, as illustrated in FIG. 3, the first driver 31 includes an air cylinder provided at an inner side of the frame 40. A tube 31a of the air cylinder extends parallel to the guide 13. The sliding part 14 is driven by the piston 31b of the air cylinder. The piston 31b is moved by adjusting the pressure inside the tube 31a. Simultaneously, the sliding part 14 that is fixed to the piston moves along the guide 13. Thereby, the rotation part 11 and the supporter 10 are moved in the longitudinal direction. The first driver 31 is not limited to the example; the first driver 31 may include an actuator such as a motor, etc., instead of the air cylinder.

A not-illustrated stopper is provided in at least one of the rotation part 11 or the sliding part 14. The stopper contacts a mating member when the rotation part 11 rotates a prescribed angle around the lateral axis. The rotation range of the rotation part 11 is regulated by the stopper.

As illustrated in FIGS. 1, 2, and 4, an abutment part 15 is fixed to the frame 40. The abutment part 15 is located at the side of the frame 40. The rotation part 11 contacts and abuts the abutment part 15 when the rotation part 11 moves frontward. The contact position between the rotation part 11 and the abutment part 15 is different from the position of the rotation axis 12. Therefore, torque acts around the rotation axis 12 when the rotation part 11 contacts the abutment part 15. The rotation part 11 is rotated around the rotation axis 12 by the torque; and the tilt of the rotation part 11 with respect to the longitudinal direction is changed.

For example, as illustrated in FIG. 4, the frame 40 includes a vertical frame 41 and a horizontal frame 42. The vertical frame 41 is a plate-shaped member that spreads along the longitudinal and vertical directions. The horizontal frame is a plate-shaped member that spreads along the longitudinal and lateral directions. The vertical frame 41 and the horizontal frame 42 are fixed to each other. One lateral-direction end of the horizontal frame 42 is fixed to the upper end of the vertical frame 41. The upper end of the abutment part 15 is fixed to the other lateral-direction end of the horizontal frame 42. The abutment part 15 is separated from the vertical frame 41 in the lateral direction.

For example, the first driver 31 moves the rotation part 11 between a first position and a second position. The distance in the longitudinal direction between the first position and a gripping surface 22 of the gripper 20 is greater than the distance in the longitudinal direction between the second position and the gripping surface 22. In other words, the first position is further backward than the second position. When the rotation part 11 is at the second position, the supporter 10 protrudes from the gripper 20 and the frame 40 along the longitudinal direction. The protrusion amount (the length) in the longitudinal direction of the supporter 10 with respect to the frame 40 when the rotation part 11 is at the second position is greater than the protrusion amount in the longitudinal direction of the supporter 10 with respect to the frame 40 when the rotation part 11 is at the first position. The supporter 10 may not protrude from the frame 40 when the rotation part 11 is at the first position. In other words, the protrusion amount in the longitudinal direction of the supporter 10 with respect to the frame 40 may be zero when the rotation part 11 is at the first position.

Figure 5A:
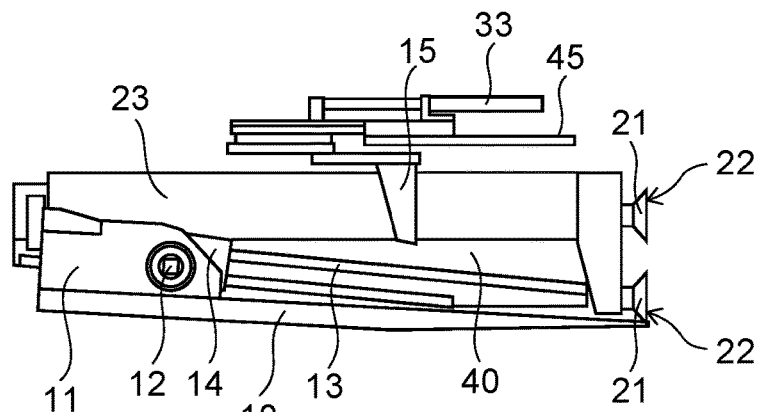
FIGS. 5A to 5C are side views illustrating the holding device according to the embodiment.
Figure 5B:
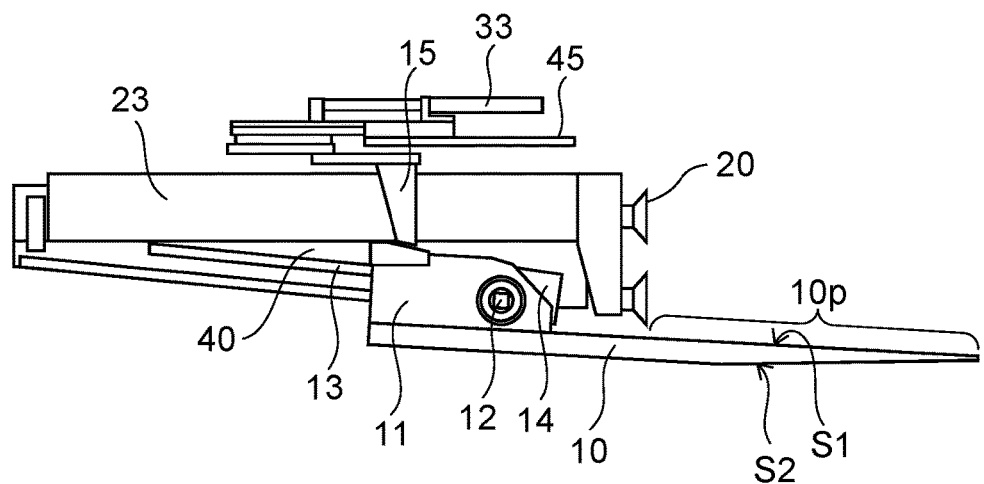
Figure 5C:
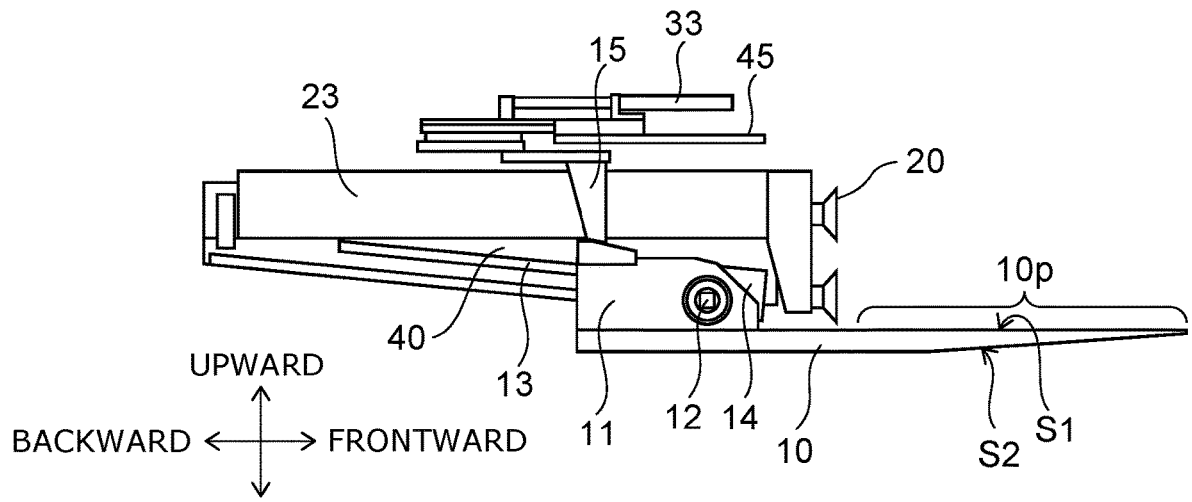

FIG. 5A illustrates a first state in which the rotation part 11 is at the first position. FIG. 5B illustrates a state when the rotation part 11 contacts the abutment part 15 directly before the rotation part 11 reaches the second position. FIG. 5C illustrates a second state in which the rotation part 11 is at the second position. As illustrated in FIG. 5A, the supporter 10 is tilted with respect to the longitudinal direction in the first state. As illustrated in FIGS. 5B and 5C, the rotation part 11 rotates around the lateral axis as the rotation part 11 contacts the abutment part 15. As a result, the tilt of the supporter 10 with respect to the longitudinal direction is smaller in the second state than in the first state. For example, in the second state, the upper surface of the supporter 10 is horizontal. The tilt of the supporter 10 with respect to the gripping surface 22 is changed by the operation illustrated in FIGS. 5A to 5C.

As illustrated in FIG. 6, a roller 16 is rotatably mounted at the lower end of the abutment part 15. A contact piece 17 is mounted at the upper end of the rotation part 11. The upper surface of the contact piece 17 includes a first sloped surface 17a and a second sloped surface 17b. The first sloped surface 17a and the second sloped surface 17b are tilted with respect to the longitudinal direction when the rotation part 11 is at the first position or the second position.

When the rotation part 11 is at the first position, the tilts with respect to the longitudinal direction of the first sloped surface 17a and the second sloped surface 17b are greater than the tilt with respect to the longitudinal direction of the guide 13. The roller 16 contacts the first sloped surface 17a when the rotation part 11 moves toward the second position. Thereby, torque around the lateral axis is applied to the rotation part 11. The rotation part 11 moves further toward the second position while rotating. The roller 16 rolls up the first sloped surface 17a as the rotation part 11 moves. The rotation of the rotation part 11 is stopped by the stopper described above; and the roller 16 stops on the second sloped surface 17b when the rotation part 11 reaches the second position. For example, the second sloped surface 17b is substantially parallel to the guide 13 at this time.

The tilt with respect to the longitudinal direction of the first sloped surface 17a is, for example, greater than the tilt with respect to the longitudinal direction of the second sloped surface 17b. Or, the tilt with respect to the longitudinal direction of the first sloped surface 17a may be equal to the tilt with respect to the longitudinal direction of the second sloped surface 17b.

As illustrated in FIGS. 5B and 5C, the supporter 10 includes a placement portion 10p where the workpiece W is placed. The placement portion 10p includes a first surface S1 that extends along the longitudinal direction and contacts the workpiece W, and a second surface S2 at the side opposite to the first surface S1. In the illustrated example, the distance in the vertical direction between the first surface S1 and the second surface S2 decreases away from the rotation part 11. In other words, the thickness of the placement portion 10p decreases away from the rotation part 11.

The thickness of the placement portion 10p may change continuously or in a staircase configuration. Favorably, the bottom surface of the placement portion 10p is sloped upward as illustrated in FIGS. 5B and 5C; and the thickness of the placement portion 10p continuously changes. Due to the change of the thickness, interference of the supporter 10 with another member can be suppressed even when the supporter 10 moves in a direction that is tilted from the longitudinal direction.

In the illustrated example, the position in the longitudinal direction of the gripping surface 22 is between the position in the longitudinal direction of the rotation axis 12 and the position in the longitudinal direction of the placement portion 10p. In other words, the rotation axis 12 is positioned further backward of the gripping surface 22.

As illustrated in FIG. 5A, the gripper 20 includes a suction pad 21. The gripping surface 22 that contacts the workpiece W is located at the front end of the suction pad 21. The gripping surface 22 spreads along the vertical and lateral directions. A not-illustrated pressure regulating unit is connected to the suction pad 21. The suction pad 21 can be caused to grip the workpiece W by depressurizing the interior of the suction pad 21 in a state in which the gripping surface 22 contacts the workpiece W.

The suction pad 21 is elastic. Therefore, the suction pad 21 is deformable along the shape of the workpiece W when contacting the workpiece W. Also, the suction pad 21 is deformable according to the change of the position or the tilt of the workpiece W when gripping the workpiece W.

A second driver 32 moves the gripper 20 in the longitudinal direction. It is favorable for the gripper 20 to move linearly along the longitudinal direction to cause the gripping surface 22 to perpendicularly contact the side surface of the workpiece W. The second driver 32 includes, for example, a motor 32a, a pulley 32b, and a belt 32c. The second driver 32 uses a belt drive to move the gripper 20. Or, the second driver 32 may include an air cylinder, etc.

As one specific example, the gripper 20 is fixed to a sliding part 23 as illustrated in FIGS. 1 and 2. The sliding part 23 is located between the abutment part 15 and the vertical frame 41 illustrated in FIG. 4. When the second driver 32 drives the sliding part 23, the sliding part 23 moves along the longitudinal direction between the abutment part 15 and the vertical frame 41. Thereby, the gripper 20 that is fixed to the sliding part 23 is moved in the longitudinal direction.

As illustrated in FIG. 4, an engaging groove 24 is provided along the longitudinal direction in the side surface of the vertical frame 41. The sliding part 23 includes a not-illustrated guide; and the engaging groove 24 engages the guide. The movement direction of the sliding part 23 is regulated by the engagement of the guide and the engaging groove 24. The gripper 20 is mounted to the frame 40 via the sliding part 23 and the engaging groove 24.

In the holding device 100, multiple supporters 10 are provided in the lateral direction. The multiple supporters 10 support the weight of the workpiece W from below. Also, multiple grippers 20 are provided in the vertical and lateral directions. The multiple grippers 20 grip the workpiece W.

Figure 7A:
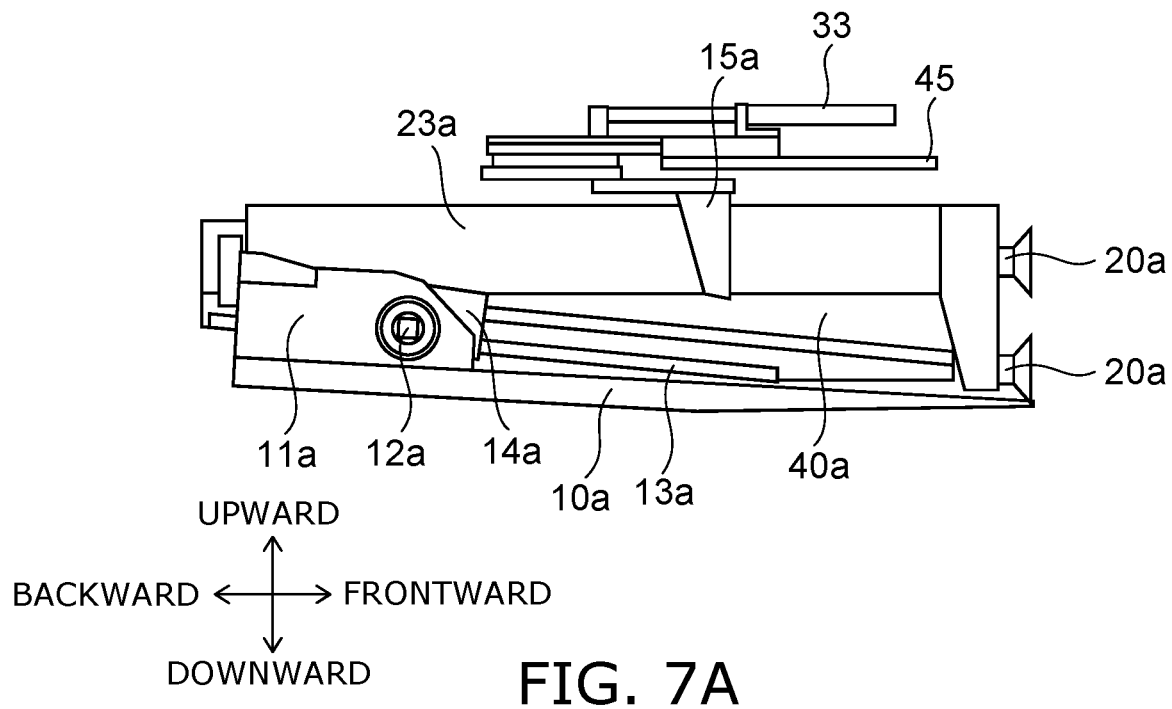
FIGS. 7A and 7B are side views illustrating the holding device according to the embodiment.
Figure 7B:
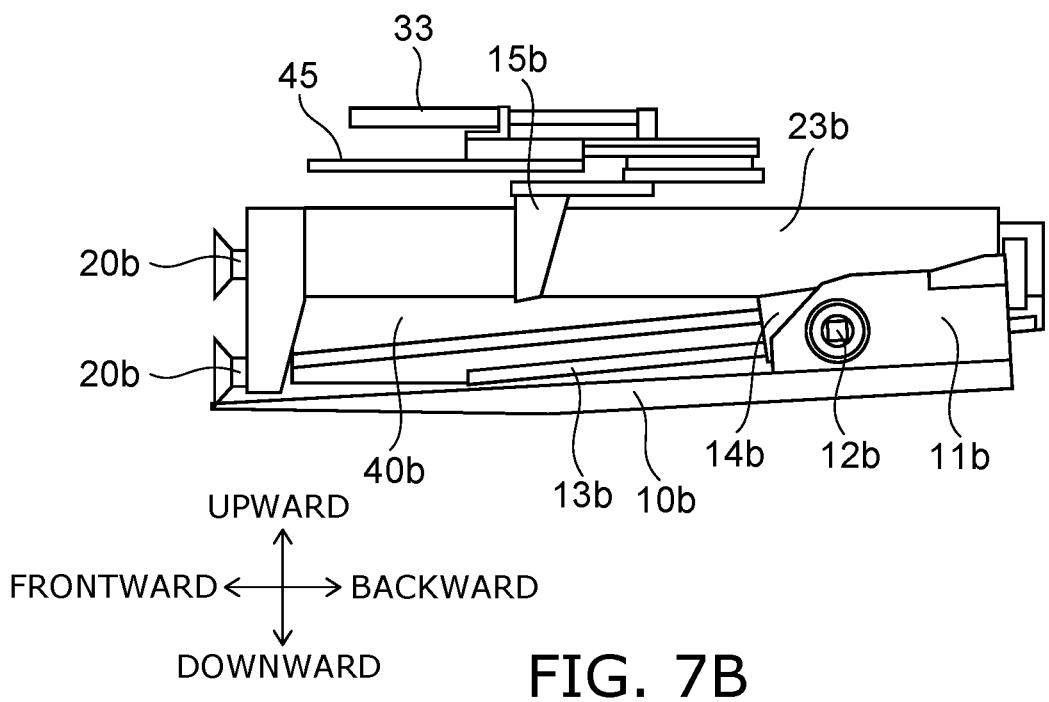

For example, as illustrated in FIGS. 7A and 7B, the holding device 100 includes a first supporter 10a that is provided at the right side, and a second supporter 10b that is provided at the left side. The first supporter 10a and the second supporter 10b are fixed respectively to a first rotation part 11a and a second rotation part 11b. The first rotation part 11a and the second rotation part 11b are mounted respectively to a first sliding part 14a and a second sliding part 14b via a first rotation axis 12a and a second rotation axis 12b.

The first sliding part 14a and the second sliding part 14b are driven by the cylinder of the first driver 31. For example, the first sliding part 14a is fixed to the cylinder; and the second sliding part 14b is coupled to the first sliding part 14a. Thereby, the position in the longitudinal direction of the second sliding part 14b is fixed with respect to the first sliding part 14a. The first sliding part 14a and the second sliding part 14b respectively move simultaneously along a first guide 13a and a second guide 13b. The first rotation part 11a and the first sliding part 14a are mounted to a first frame 40a. The second rotation part 11b and the second sliding part 14b are mounted to a second frame 40b. The first rotation part 11a and the second rotation part 11b respectively abut a first abutment part 15a and a second abutment part 15b that are fixed to the first and second frames 40a and 40b.

The holding device 100 also includes multiple first grippers 20a that are provided at the right side, and multiple second grippers 20b that are provided at the left side. The multiple first grippers 20a are mounted to the first frame 40a via a first sliding part 23a. The multiple second grippers 20b are mounted to the second frame 40b via a second sliding part 23b. The multiple first grippers 20a and the multiple second grippers 20b are connected to the second driver 32. The multiple first grippers 20a and the multiple second grippers 20b move simultaneously in the longitudinal direction.

For example, the structure of the first supporter 10a, the first rotation part 11a, the first rotation axis 12a, the first guide 13a, the first sliding part 14a, the first gripper 20a, and the first frame 40a and the structure of the second rotation part 11b, the second rotation axis 12b, the second guide 13b, the second sliding part 14b, the second gripper 20b, and the second frame 40b have generally planar symmetry with each other when referenced to a vertical plane passing through the lateral-direction center of the holding device 100.

The first frame 40a is arranged in the lateral direction with the second frame 40b. The distance in the lateral direction between the first frame 40a and the second frame 40b may be changeable. The distance between the first supporter 10a and the second supporter 10b and the distance between the first gripper 20a and the second gripper 20b increase as the distance between the first frame 40a and the second frame 40b increases as illustrated in FIG. 8.

The positions in the lateral direction of the first and second frames 40a and 40b are changeable with respect to a base 45. The distance in the lateral direction between the second frame 40b and the base 45 changes synchronously with the distance in the lateral direction between the first frame 40a and the base 45. For example, the distance between the first frame 40a and the second frame 40b can be switched according to the lateral-direction length of the workpiece W. The workpiece W can be more stably held thereby.

As an example, the workpiece W is transferred by a roller conveyor RC. The roller conveyor RC includes multiple rollers R. The workpiece W is transferred by the rotation of the rollers R. The widths (the lengths in the lateral direction) of the first and second supporters 10a and 10b are less than the spacing between the adjacent rollers R. The spacing between the first supporter 10a and the second supporter 10b is set to correspond to the spacing between the adjacent rollers R in both of the states illustrated in FIGS. 1 and 8. Specifically, a distance D1 between the lateral-direction center of the first supporter 10a and the lateral-direction center of the second supporter 10b is an integer multiple of a distance D2 between the lateral-direction center of one roller R and the lateral-direction center of another roller R adjacent to the one roller R in the states illustrated in FIGS. 1 and 8. The first supporter 10a and the second supporter 10b can be positioned between the rollers R by causing the spacing between the first supporter 10a and the second supporter 10b to correspond to the spacing between the rollers R.

The holding device 100 includes an adjustment mechanism for adjusting the distance between the first frame 40a and the second frame 40b. The adjustment mechanism includes a first protrusion 51a, a second protrusion 51b, an engaging member 52, and a third driver 33.

As illustrated in FIGS. 9A and 9B, the first protrusion 51a is fixed with respect to the first frame 40a. The second protrusion 51b is fixed with respect to the second frame 40b. In the illustrated example, the first protrusion 51a is fixed to a horizontal frame 42a of the first frame 40a. The second protrusion 51b is fixed to a horizontal frame 42b of the second frame 40b. A first groove 52a and a second groove 52b that respectively engage with the first and second protrusions 51a and 51b are provided in the engaging member 52.

The distance in the lateral direction between the first groove 52a and the second groove 52b changes according to the position in the longitudinal direction. In the illustrated example, the distance in the lateral direction between the first groove 52a and the second groove 52b gradually increases backward.

The position in the longitudinal direction of the first protrusion 51a and the position in the longitudinal direction of the second protrusion 51b are fixed. For example, as illustrated in FIG. 4, engaging grooves 46 are provided in the first and second frames 40a and 40b. A not-illustrated guide is provided at the lower surface of the base 45. The engaging groove 46 and the guide are provided along the lateral direction. The engagement of the guide and the engaging groove 46 laterally regulate the movement directions of the first and second frames 40a and 40b and fix the positions in the longitudinal direction of the first and second frames 40a and 40b.

The third driver 33 moves the engaging member 52 in the longitudinal direction with respect to the first frame 40a, the second frame 40b, and the base 45. The first protrusion 51a and the second protrusion 51b move in the lateral direction according to the distance between the first groove 52a and the second groove 52b when the engaging member 52 moves in the longitudinal direction. The first frame 40a and the second frame 40b move in the lateral direction according to the movements of the first and second protrusions 51a and 51b. In other words, the motion in the longitudinal direction of the engaging member 52 is converted into the motions in the lateral direction of the first and second frames 40a and 40b by the first protrusion 51a, the second protrusion 51b, and the engaging member 52.

The third driver 33 moves the engaging member 52 between the first engagement position and the second engagement position. The distance between the first protrusion 51a and the second protrusion 51b when the engaging member 52 is at the first engagement position is different from the distance between the first protrusion 51a and the second protrusion 51b when the engaging member 52 is at the second engagement position. The distance between the first supporter 10a and the second supporter 10b that are mounted respectively to the first and second frames 40a and 40b can be changed by the movement of the engaging member 52.

As one specific example, the first engagement position is positioned further backward of the second engagement position. FIG. 9A illustrates the state when the engaging member 52 is at the first engagement position. FIG. 9B illustrates the state when the engaging member 52 is at the second engagement position. A distance D3 between the first protrusion 51a and the second protrusion 51b in the state illustrated in FIG. 9A is less than a distance D4 between the first protrusion 51a and the second protrusion 51b in the state illustrated in FIG. 9B. When the engaging member 52 is in the state illustrated in FIG. 9A, the distance between the supporters 10 is relatively short as illustrated in FIG. 1. When the engaging member 52 is in the state illustrated in FIG. 9B, the distance between the supporters 10 is relatively long as illustrated in FIG. 9B.

The third driver 33 includes, for example, an air cylinder. The third driver 33 may include an actuator such as a motor, etc., instead of the air cylinder.

For example, the operation of the holding device 100 is controlled by a controller 90. The controller 90 is electrically connected to the components of the holding device 100 and transmits signals to the components. The components operate based on the signals transmitted from the controller 90.

FIGS. 10A to 12B are schematic views illustrating a transfer method according to the embodiment.

Figure 10A:
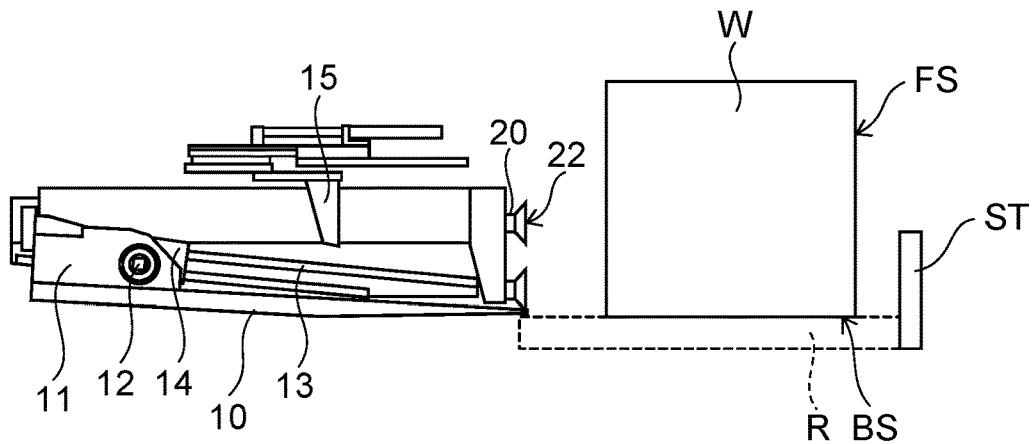
FIGS. 10A to 10C are schematic views illustrating a transfer method according to the embodiment.
Figure 10B:
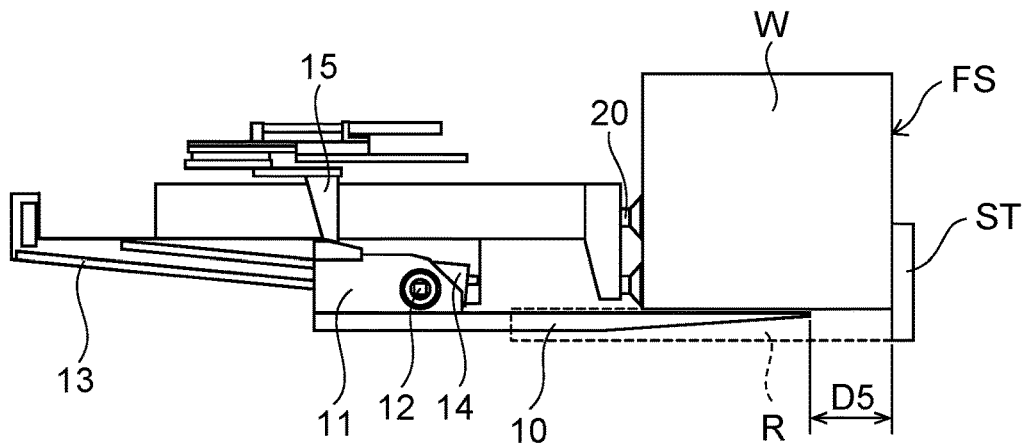
Figure 10C:
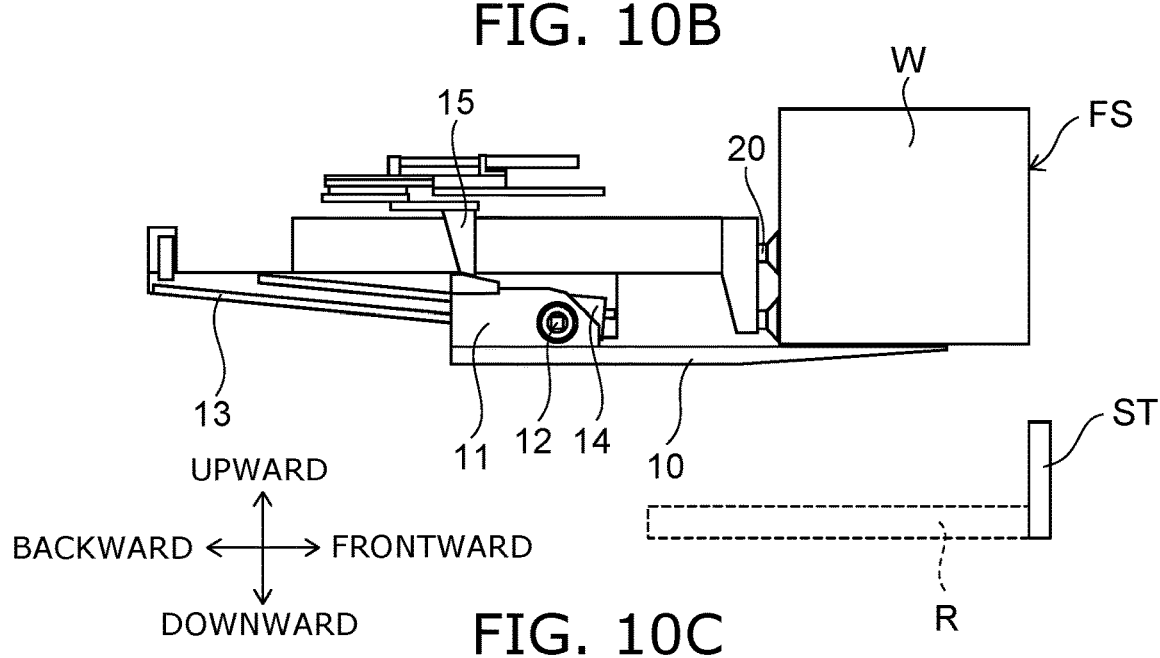

The transfer method according to the embodiment includes a holding method illustrated in FIGS. 10A to 10C, and a placement method illustrated in FIGS. 11B to 12B. The transfer method can be performed using the holding device 100.

For example, as illustrated in FIG. 10A, the workpiece W is located on the multiple rollers R. The holding device 100 moves to the side of the workpiece W. The position of the holding device 100 is adjusted in the vertical, lateral, and longitudinal directions so that the supporter 10 is positioned between the rollers R when holding the workpiece W.

After adjusting the holding device 100, the second driver 32 moves the gripper 20 frontward and causes the gripper 20 to contact the workpiece W. A stopper ST is provided at the roller conveyor adjacent to the rollers R. The workpiece W is pressed frontward by the gripper 20 until the workpiece W contacts the stopper ST. The gripper 20 grips the workpiece W when the workpiece W contacts the stopper ST. Continuing as illustrated in FIG. 10B, the first driver 31 moves the rotation part 11 from the first position to the second position. Thereby, the supporter 10 is moved frontward. The supporter 10 is positioned between the rollers R and is slightly separated from the bottom surface of the workpiece W. At this time, the front end of the workpiece W is positioned further frontward of the front end of the supporter 10.

By the operations illustrated in FIGS. 10A and 10B, the position in the longitudinal direction of the holding device 100 is adjusted to a predetermined position; and the position of a front surface FS of the workpiece W is adjusted to the position of the stopper ST. Thereby, a distance D5 between the stopper ST and the front end of the supporter 10 is a constant value regardless of the length in the longitudinal direction of the workpiece W.

The holding device 100 is raised from the state illustrated in FIG. 10B. The supporter 10 also is raised; and at least a portion of the supporter 10 contacts the bottom surface of the workpiece W. The workpiece W is supported from below by the supporter 10. The likelihood of the workpiece W dropping from the supporter 10 due to inertia acting on the workpiece W, etc., can be reduced by the gripping. The holding device 100 is further raised as illustrated in FIG. 10C after the workpiece W is held by the supporting and the gripping.

The sequence of the gripping of the workpiece W by the gripper 20 and the movement of the supporter 10 is modifiable as appropriate. For example, when the workpiece W has not yet reached the position at which the workpiece W is to be held, the supporter 10 goes ahead and moves; and the holding device 100 waits at the position until the workpiece W arrives. The time that is necessary to hold the workpiece W after the workpiece W arrives can be reduced thereby. The rotation part 11 may be moved from the first position to the second position when moving the holding device 100 to the standby position.

When the workpiece W has already reached the position at which the workpiece W is to be held, it is favorable for the holding device 100 to be moved to the position of the workpiece W in the state in which the rotation part 11 is at the first position. The length in the longitudinal direction of the holding device 100 is longer when the rotation part 11 is at the second position than when the rotation part 11 is at the first position. If the holding device 100 is moved when the rotation part 11 is at the second position, a wider space is necessary to move the holding device 100.

Figure 11A:
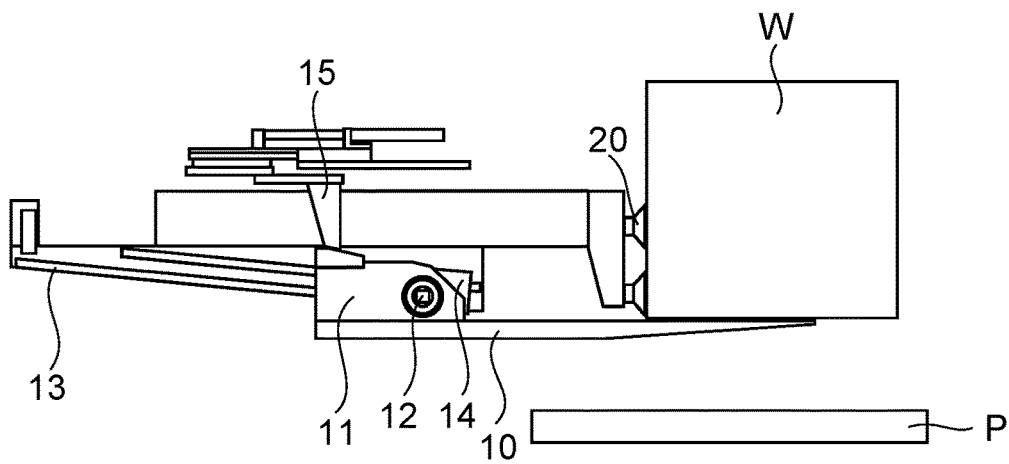
FIGS. 11A to 11C are schematic views illustrating the transfer method according to the embodiment.

After raising the holding device 100, the holding device 100 is moved to the transfer destination of the workpiece W. For example, as illustrated in FIG. 11A, the holding device 100 is moved so that the workpiece W is positioned on a pallet P.

Figure 11B:
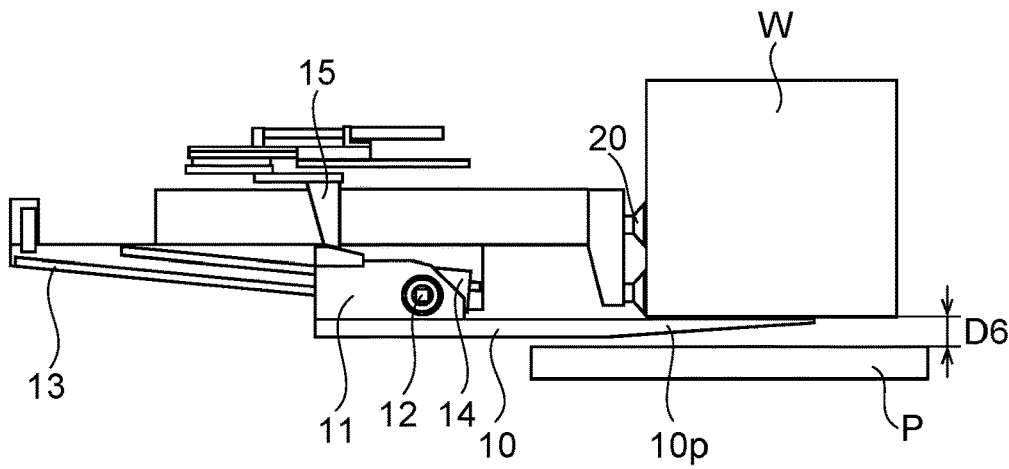

The holding device 100 is moved toward the placement location (the pallet P) of the workpiece W. At this time, as illustrated in FIG. 11B, the holding device 100 is moved so that a distance D6 between the workpiece W and the placement location becomes a prescribed value.

Then, the supporter 10 is tilted to increase the tilt of the supporter 10 with respect to the gripping surface 22. Specifically, the first driver 31 moves the rotation part 11 slightly backward of the second position. When the rotation part 11 is moved in the direction away from the abutment part 15, the rotation part 11 is rotated around the rotation axis 12 by the weight of the workpiece W and the supporter 10. For example, the rotation part 11 is rotated until restricted by the not-illustrated stopper. Thereby, the supporter 10 is tilted to a pre-regulated angle with respect to the direction.

Figure 11C:
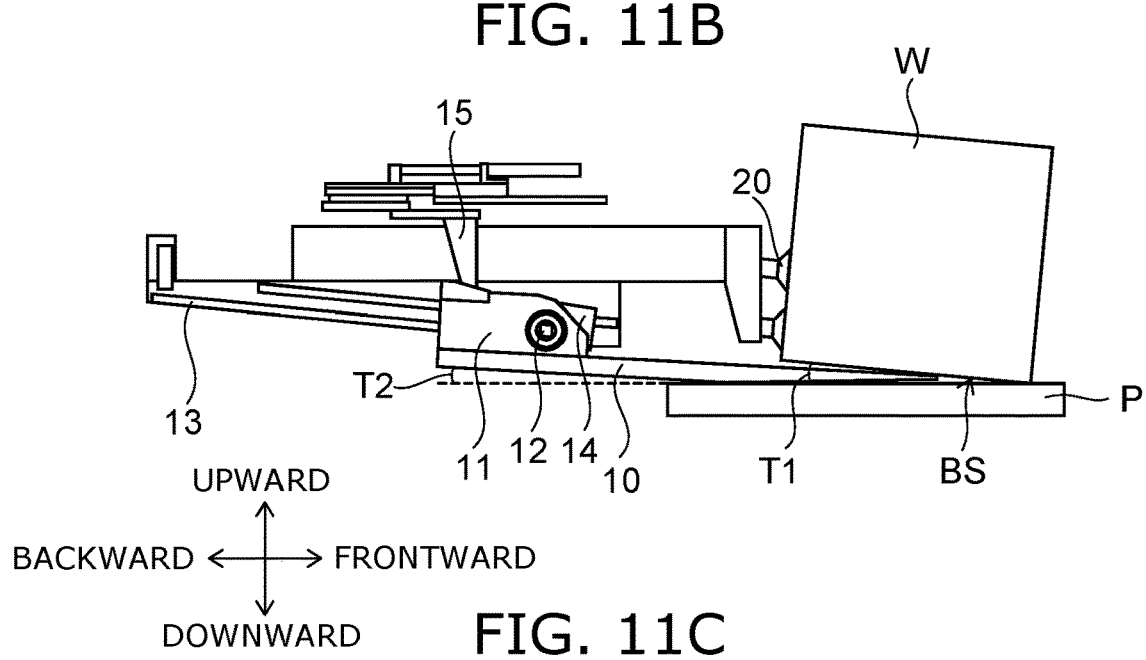

The workpiece W also is tilted as the supporter 10 is tilted. One side of the bottom surface BS of the workpiece W contacts the placement location. Also, the gripper 20 is deformed according to the tilt of the workpiece W while maintaining the gripping of the workpiece W. In the illustrated example, the rotation axis 12 is positioned further backward of the gripper 20. Therefore, a tilt T1 with respect to the longitudinal direction of the bottom surface BS is greater than a tilt T2 of the supporter 10 with respect to the longitudinal direction. As a result, as illustrated in FIG. 11C, the bottom surface BS is separated from the supporter 10. The weight of the workpiece W is supported by the gripper 20 and the reaction force from the placement location.

When the distance D5 illustrated in FIG. 10B is short, the tip of the supporter 10 is positioned between the bottom surface BS and the placement location of the workpiece W when the supporter 10 is tilted; and the workpiece W does not contact the placement location. Therefore, the distance D5 is set to be as short as possible in the range in which the workpiece W contacts the placement location when tilting the workpiece W. Also, in the illustrated example, the tilt when tilting the supporter 10 is regulated by the mechanism of the rotation part 11 and the sliding part 14. The displacement amount in the vertical direction of the one side of the bottom surface BS due to the tilt of the supporter 10 is determined by the distance D5 and the tilt when tilting the supporter 10. When lowering the holding device 100, the position in the vertical direction of the holding device 100 is determined based on the displacement amount. For example, the position in the vertical direction of the holding device 100 with respect to the placement location is determined so that the distance D6 between the placement location and the workpiece W (shown in FIG. 11B) is not more than the displacement amount.

By setting the thickness of the placement portion 10p of the supporter 10 to decrease away from the rotation part 11, the workpiece W can be caused to contact the placement location when tilting the supporter 10 even when the distances D5 and D6 are short. The workpiece W can be supported more stably as the distance D5 is reduced. The impact that is applied to the workpiece W when the gripping by the gripper 20 is released can be reduced by reducing the distance D6.

Figure 12A:
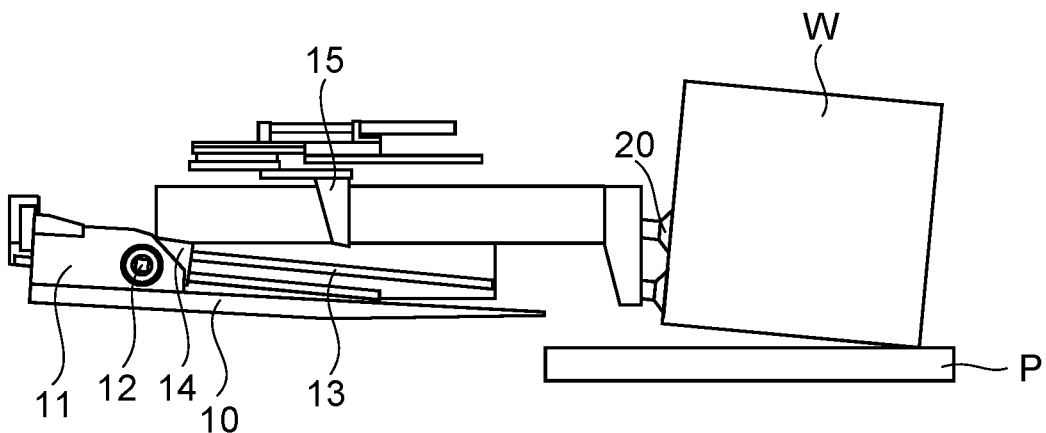
FIGS. 12A and 12B are schematic views illustrating the transfer method according to the embodiment.
Figure 12B:
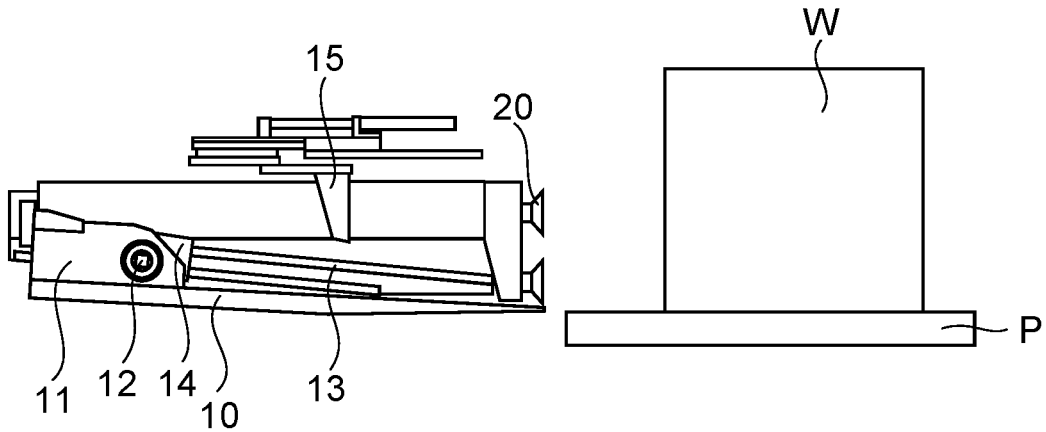

As illustrated in FIG. 12A, the supporter 10 is moved backward and is separated from the workpiece W so that the supporter 10 is not positioned between the placement location and the workpiece W. The pressure inside the suction pad 21 is increased after moving the supporter 10. For example, the pressure inside the suction pad 21 is set to atmospheric pressure. The gripping of the workpiece W by the gripper 20 is released thereby. As illustrated in FIG. 12B, the workpiece W is placed at the placement location. Thus, the transfer of the workpiece W by the holding device 100 is completed.

Effects according to the embodiment will now be described.

Figure 13A:
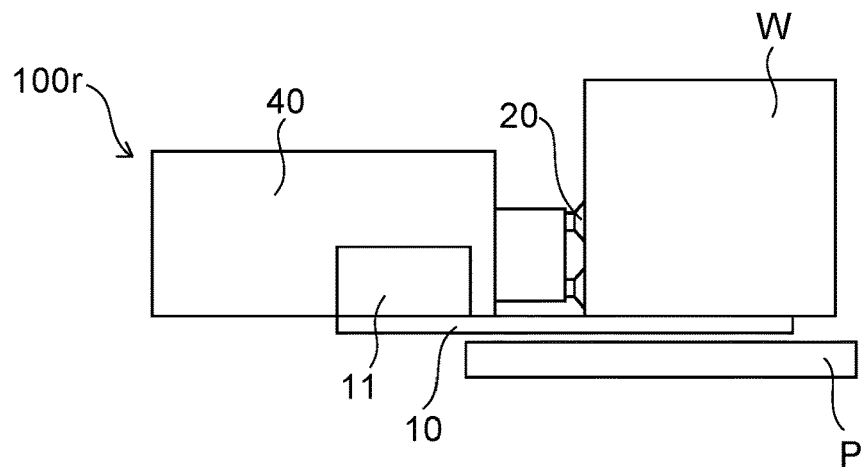
FIGS. 13A to 13C are schematic views illustrating an operation of a holding device according to a reference example.
Figure 13B:
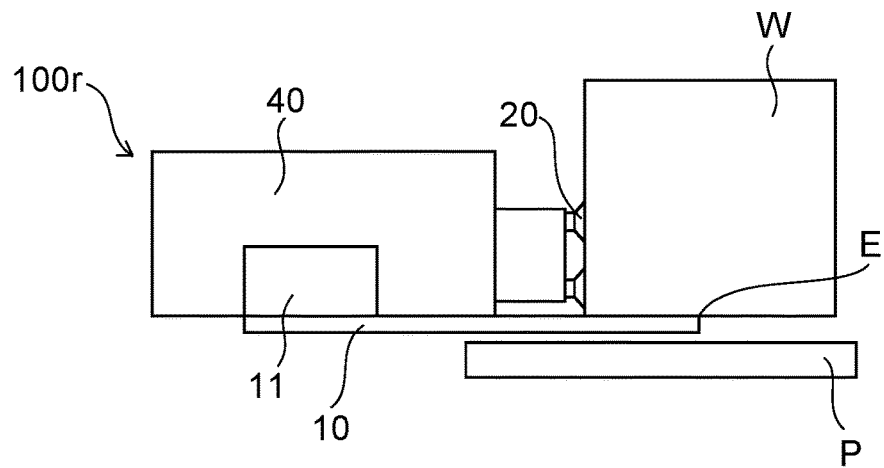

FIGS. 13A and 13B are schematic views illustrating an operation of a holding device according to a reference example.

Figure 13C:
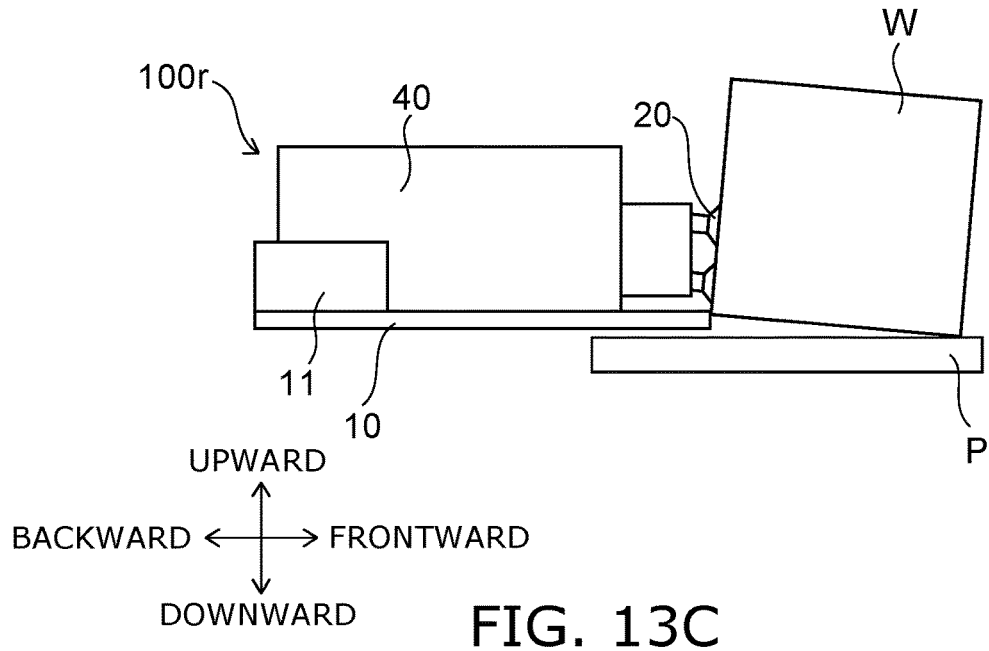

The tilt of the supporter 10 with respect to the gripping surface is constant in the holding device 100r according to the reference example illustrated in FIGS. 13A to 13C.

When using the holding device 100r to transfer the workpiece W, the workpiece W is transferred above the pallet P that is the placement location as illustrated in FIG. 13A. The supporter 10 is moved backward as illustrated in FIG. 13B in the state in which the workpiece W is gripped. At this time, the backward movement of the workpiece W is restricted by the gripper 20. A portion of the workpiece W drops onto the placement location when supporter 10 moves further backward from the state illustrated in FIG. 13B. Subsequently, the workpiece W is placed on the placement location by releasing the gripping of the workpiece W.

When the holding device 100r according to the reference example is used, the weight of the workpiece W concentrates at a front end E of the supporter 10 when the supporter 10 is moved backward. A reaction force that corresponds to the weight of the workpiece W is locally applied from the front end of the supporter 10 to the workpiece W. There is a possibility that the bottom surface of the workpiece W may be dented and the packaged article may be damaged by the reaction force on the workpiece W.

In the holding device 100 according to the embodiment, the tilt of the supporter 10 with respect to the gripping surface 22 is changeable. Thereby, when placing the workpiece W, the tilt of the supporter 10 with respect to the longitudinal direction can be increased while gripping the workpiece W. As illustrated in FIG. 11C, the workpiece W can be caused to contact the placement location by tilting the supporter 10 before moving the supporter 10 backward. The reaction force that is locally applied to the workpiece W can be reduced by dispersing the weight of the workpiece W over the placement location. As a result, the likelihood of the workpiece W being damaged by the reaction force from the supporter 10 on the workpiece W when placing the workpiece W can be reduced.

Although the positional relationship between the rotation axis 12 and the gripping surface 22 is arbitrary, it is favorable for the rotation axis 12 to be positioned further backward of the gripping surface 22 as illustrated. If the rotation axis 12 is positioned further frontward of the gripping surface 22, the back end of the workpiece W is lifted when the supporter 10 is tilted; and a load is applied to the gripper 20. There is a possibility that the gripping may be unintentionally released thereby, and the gripper 20 may be damaged. By positioning the rotation axis 12 further backward of the gripping surface 22, the gripping of the workpiece W can be more stably maintained, and the likelihood of the gripper 20 being damaged can be reduced.

It is favorable for the tilt of the supporter 10 to be changed according to the movement of the supporter 10. In other words, it is favorable to change the tilt of the supporter 10 according to the movement of the rotation part 11 between the first position and the second position due to the first driver 31. Although a driver for changing the tilt of the supporter 10 may be provided, this would result in a larger holding device 100. It is necessary to position the holding device 100 at the side of the workpiece W to grip and hold the workpiece W. When the holding device 100 is small, the holding device 100 can be moved into the space at the side of the workpiece W even when the space is small.

When placing the workpiece W, the position in the vertical direction of the front end of the supporter 10 also changes when the tilt of the supporter 10 is changed by the movement of the rotation part 11. The displacement amount of the front end also increases as the change of the tilt of the supporter 10 increases. If the difference between the tilt of the supporter 10 with respect to the longitudinal direction at the first position and the tilt of the supporter 10 with respect to the longitudinal direction at the second position is too large, the rotation range of the supporter 10 also increases, and a wider space is necessary to operate the holding device 100. On the other hand, if the difference is too small, it is difficult to cause the workpiece W to contact the placement location when placing the workpiece W. Therefore, it is favorable for the difference between the tilt of the supporter 10 with respect to the longitudinal direction at the first position and the tilt of the supporter 10 with respect to the longitudinal direction at the second position to be not less than 1 degree and not more than 10 degrees. More favorably, the difference is not less than 2 degrees and not more than 5 degrees.

In the illustrated example, multiple supporters 10 are provided in the lateral direction. The supporter 10 is not limited to the example; one supporter 10 that is wider may be provided. As illustrated in FIGS. 1 and 8, it is favorable to provide multiple supporters 10 so that the supporters 10 can be positioned between the rollers R when holding the workpiece W located on the multiple rollers R.

The holding device 100 or the placement method according to the embodiment is particularly effective when the supporter 10 is narrow. When the supporter 10 is narrow, the reaction force per unit area that is applied from the front end E to the workpiece W when placing the workpiece W by the method illustrated in FIGS. 13A to 13C is further increased. Therefore, damage of the workpiece W occurs more easily. According to the holding device 100 or the placement method according to the embodiment, even when the supporter 10 is narrow, the weight of the workpiece W is supported by the gripper 20 and one side of the bottom surface BS. Therefore, the likelihood of the workpiece W being damaged can be reduced regardless of the configuration of the supporter 10.

It is favorable for the distance in the lateral direction between the supporters 10 to be changeable. The workpiece W can be more stably held by changing the distance between the supporters 10 according to the size of the workpiece W. For example, the workpiece W can be more reliably prevented from dropping, even when the movement speed when transferring the workpiece W is increased. As a result, the efficiency of the transfer operation can be increased.

As illustrated in FIGS. 9A and 9B, it is favorable for the distance between the supporters 10 to be changed by converting the motion in a direction crossing the lateral direction into motion in the lateral direction. For example, when the air cylinder of the third driver 33 is provided along the lateral direction, the lateral-direction length of the holding device 100 lengthens according to the length of the tube of the air cylinder. The lateral-direction length of the holding device 100 can be reduced by converting the motion in the longitudinal direction of the air cylinder into motion in the lateral direction as illustrated in FIGS. 9A and 9B. For example, by reducing the lateral-direction length of the holding device 100 to be about equal to that of the workpiece W, the holding device 100 can be positioned in a narrow location. The holding device 100 can be easier to use.

In the illustrated example, the engaging member 52 moves in the longitudinal direction. The engaging member 52 is not limited to the example; the engaging member 52 may move in the vertical direction. In other words, motion in the vertical direction may be converted into motion in the lateral direction. However, to downsize the holding device 100, it is favorable for the engaging member 52 to move in the longitudinal direction. Because the supporter 10 moves in the longitudinal direction, it is not easy to reduce the length in the longitudinal direction of the holding device 100. The length in the vertical direction of the holding device 100 is increased by the amount of the movement distance of the engaging member when the engaging member 52 moves in the vertical direction. As a result, the length in the longitudinal direction and the length in the vertical direction of the holding device 100 become undesirably long. By moving the engaging member 52 in the longitudinal direction to match the movement direction of the supporter 10, the holding device 100 can be prevented from becoming larger in the vertical direction.

In the example described above, the holding device according to the embodiment includes the gripper 20; and the movement in the horizontal direction of the workpiece W placed on the supporter 10 is suppressed by the gripper 20. Instead of the gripper 20, the holding device according to the embodiment may include another limiter that suppresses the movement in the horizontal direction of the workpiece W. The form of the limiter is arbitrary as long as the workpiece W can be tilted according to the change of the tilt of the supporter 10 while suppressing the movement in the horizontal direction of the workpiece W.

For example, the limiter may be a pair of members provided at the left and the right of the workpiece W. The pair of members may contact the lateral-direction side surfaces of the workpiece W when the workpiece W is held. Or, the limiter may be a member provided above the workpiece W. The member may press on the workpiece W toward the supporter 10 from above when the workpiece W is held. The second driver 32 moves the limiter in the longitudinal direction. By providing the limiter, the movement in the horizontal direction of the workpiece W can be suppressed, and the likelihood of the workpiece W dropping from the supporter 10 when transferring the workpiece W can be reduced.

Modification

Figure 14:
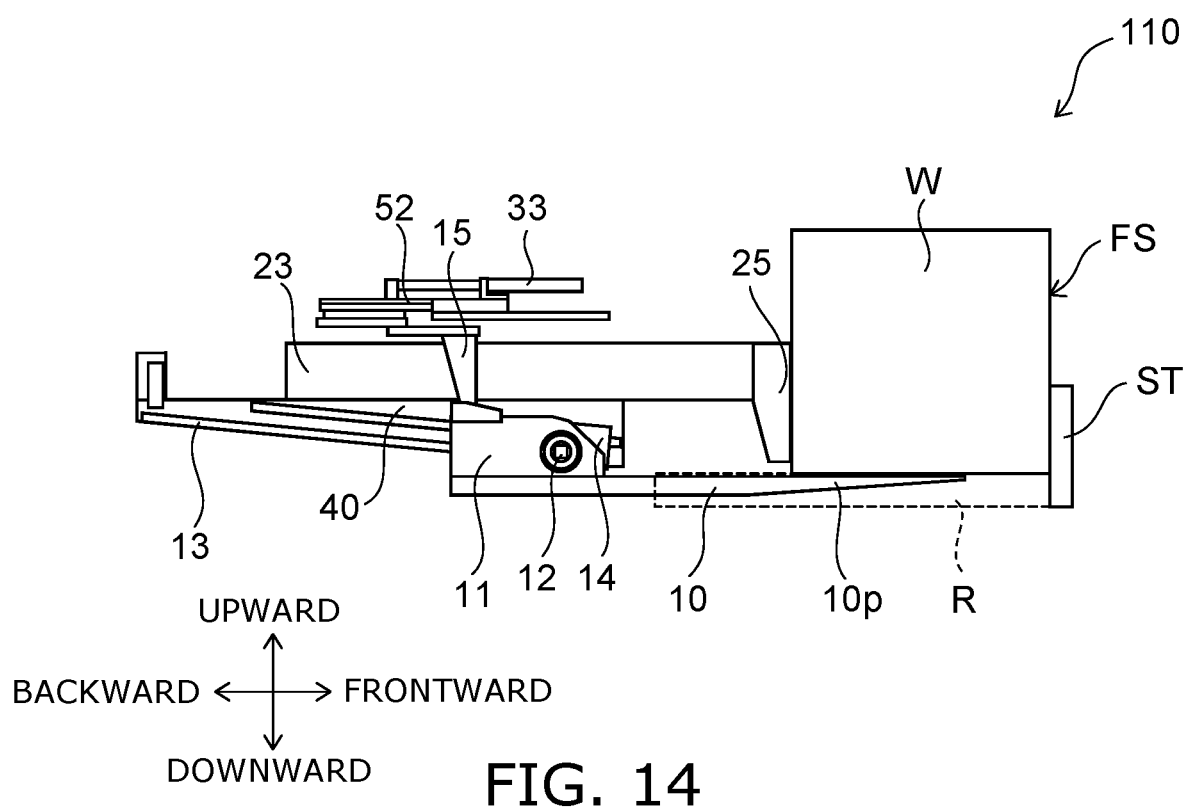
FIG. 14 is a side view illustrating a holding device according to a modification of the embodiment.

FIG. 14 is a side view illustrating a support device according to a modification of the embodiment.

A support device 110 illustrated in FIG. 14 differs from the holding device 100 in that the gripper 20 is not included. Instead of the gripper 20, the support device 110 includes a presser 25. The presser 25 presses the workpiece W frontward by moving in the longitudinal direction. The second driver 32 moves the presser 25 in the longitudinal direction.

The support device 110 transfers the workpiece W by using the supporter 10 to support the workpiece W from below. Other than the gripping of the workpiece W, the method illustrated in FIGS. 10A to 12B is applicable to the transfer method of the support device 110. The movement of the workpiece W toward the stopper ST is performed by the presser 25 and the second driver 32.

Other than the gripper 20 and the presser 25, a configuration similar to the holding device 100 is applicable to the configuration of the support device 110. For example, the tilt of the supporter 10 with respect to the longitudinal direction is changeable in the support device 110. Therefore, similarly to the holding device 100, the likelihood of the workpiece W being damaged can be reduced. Also, the distance in the lateral direction between the first frame 40a and the second frame 40b is changeable. The workpiece W can be more stably supported by causing the distance between the supporters 10 to change according to the size of the workpiece W.

In the support device 110 as well, the thickness of the placement portion 10p of the supporter 10 decreases away from the rotation part 11. Therefore, one side of the workpiece W that is lifted by the supporter 10 gradually approaches the placement location according to the change of the thickness when the supporter 10 is moved backward similarly to the process illustrated in FIG. 12A. Therefore, the impact that is applied to the workpiece W due to the workpiece W dropping to the placement location when the supporter 10 is removed from between the placement location and the workpiece W can be suppressed.

Figure 15:
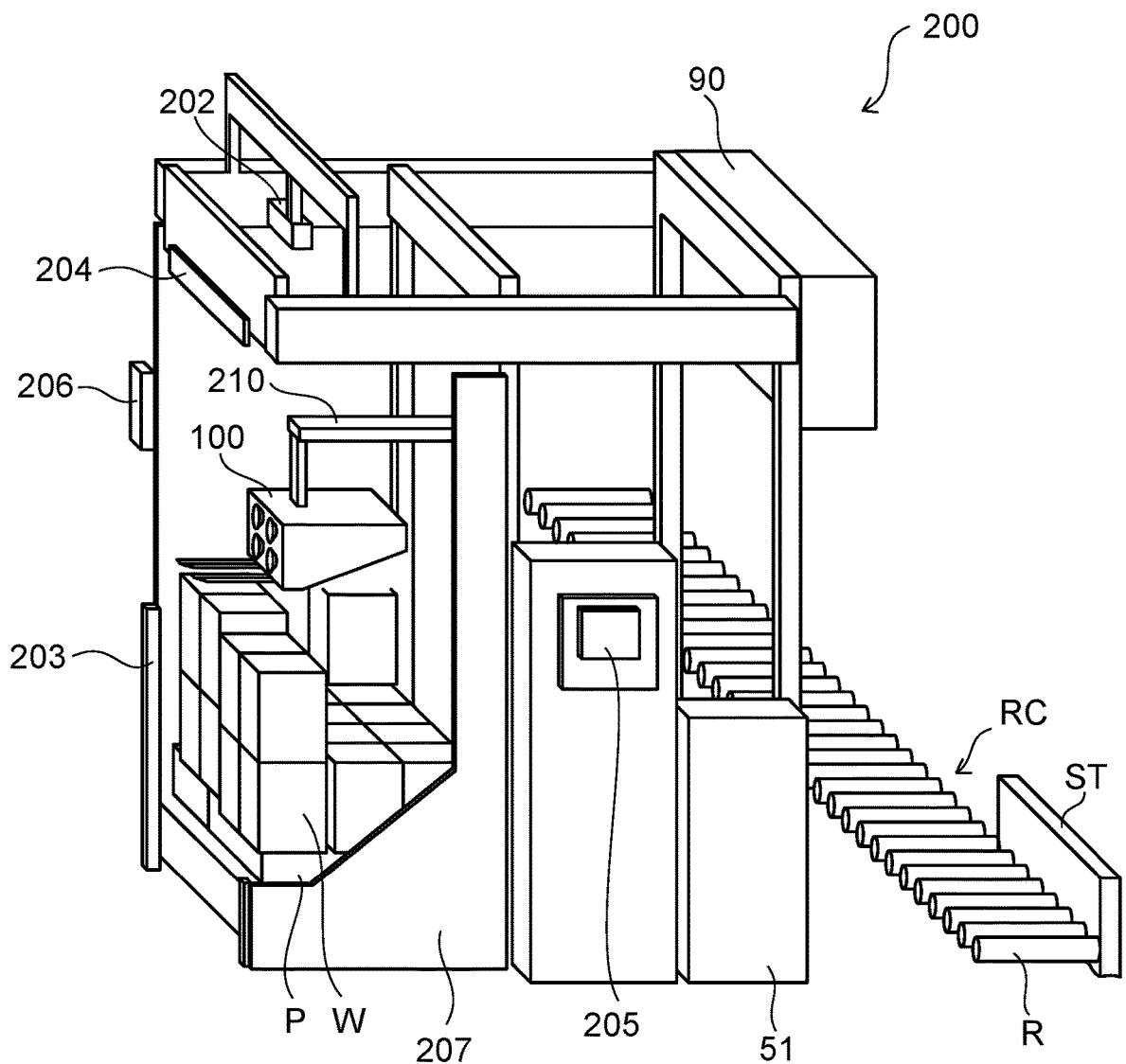
FIG. 15 is a schematic perspective view illustrating a transfer system according to the embodiment.

FIG. 15 is a schematic perspective view illustrating a transfer system according to the embodiment.

The transfer system 200 according to the embodiment includes the holding device 100, a detector 202, a detector 203, a displayer 204, a main operation part 205, a sub operation part 206, and a drive device 210.

The holding device 100 holds the workpiece W that is transferred by the roller conveyor RC. The drive device 210 is coupled to the base 45 of the holding device 100 from above. The drive device 210 transfers the workpieces W one at a time onto the pallet P by moving the holding device 100.

The detector 202 is located above the pallet P. The detector 202 detects the position and size of each workpiece W. For example, the detector 202 includes at least one of a camera or a sensor. Based on the detection result of the detector 202, the controller 90 adjusts the height (e.g., the distance D6 shown in FIG. 11B) of the holding device 100 when the holding device 100 places the workpiece W.

For example, a fence 207 is provided around the pallet P. The detector 203 is mounted to the fence 207. The detector 203 detects when a human goes inside the fence 207. The controller 90 stops or withdraws the holding device 100 when the detector 203 detects the entrance of the human inside the fence 207. Infrared sensors, distance sensors, transmission-type photoelectric sensors, etc., can be used as the detectors 202 and 203.

The displayer 204 displays the operation condition of the holding device 100. For example, the displayer 204 displays information indicating that the holding device 100 is operating or information indicating that the holding device 100 is stopped. The main operation part 205 accepts detailed operations and settings of the holding device 100. The sub operation part 206 accepts simple operations of the holding device 100.

By providing the holding device 100 in the transfer system 200, the likelihood of the workpiece W being damaged when transferring can be reduced. Or, the support device 110 may be provided in the transfer system 200. In such a case as well, similarly, the likelihood of the workpiece W being damaged when transferring can be reduced.

Here, an example is described in which one holding device 100 is provided in the transfer system 200. The transfer system 200 may include multiple holding devices 100 or multiple support devices 110.

According to the holding device, the support device, the transfer system, the holding method, the placement method, or the transfer method described above, the likelihood of the workpiece W being damaged can be reduced.

Embodiments may include the following configurations.
Configuration 1

A support device, comprising:

a first supporter and a second supporter separated from each other in a third direction, the first and second supporters extending in a second direction and supporting a weight of a workpiece in a first direction, the second direction crossing the first direction, the third direction crossing a plane including the first and second directions;

a first frame mounted to the first supporter;

a second frame mounted to the second supporter;
a first driver moving the first and second supporters in the second direction with respect to the first and second frames;
a first protrusion fixed with respect to the first frame;
a second protrusion fixed with respect to the second frame, so that the first and second protrusions are arranged with each other in the third direction;
an engaging member including
a first groove engaging the first protrusion, and
a second groove engaging the second protrusion; and
a third driver moving the engaging member with respect to the first and second frames,
the third driver moving the engaging member between a first engagement position and a second engagement position,
a distance in the third direction between the first protrusion and the second protrusion when the engaging member is at the first engagement position being different from the distance in the third direction between the first protrusion and the second protrusion when the engaging member is at the second engagement position,
a distance in the third direction between the first supporter and the second supporter being changed by the movement of the engaging member.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A holding device, comprising:
a supporter being configured to support of a workpiece in a first direction, the first direction being along a vertical direction, the supporter extending along a second direction perpendicular to the first direction;
a gripper including a suction pad that has a gripping surface and being configured to grip the workpiece in the second direction; and
a first actuator being configured to move the supporter with respect to the gripper in the second direction; and
a second actuator being configured to move the gripper in the second direction,
a tilt of the supporter in a first plane being changeable with respect to the gripping surface, the first plane being parallel to the first and second directions.

2. The holding device according to claim 1, further comprising:
a rotation part to which the supporter is fixed; and
a frame to which the rotation part is rotatably mounted,
the supporter including a placement portion at which the workpiece is placed,
a position in the second direction of the gripping surface being between a position in the second direction of the placement portion and a position in the second direction of a rotation axis of the rotation part.

3. The holding device according to claim 1, further comprising:
a rotation part to which the supporter is fixed;
a frame to which the rotation part is rotatably mounted via a rotation axis; and
an abutment part fixed with respect to the frame,
the first actuator moving the rotation part between a first position and a second position,
a distance in the second direction between the first position and the gripping surface being greater than a distance in the second direction between the second position and the gripping surface,
when the rotation part moves from the first position to the second position, the abutment part contacts the rotation part, and the tilt of the supporter with respect to the gripping surface is changed by the rotation part rotating around the rotation axis.

4. The holding device according to claim 3, wherein
a tilt of the supporter with respect to the second direction at the second position is less than the tilt of the supporter with respect to the second direction at the first position.

5. The holding device according to claim 3, wherein
the supporter includes:
a first surface extending along the second direction and contacting the workpiece; and
a second surface at a side opposite to the first surface, and
a distance in the first direction between the first surface and the second surface decreases away from the rotation part.

6. The holding device according to claim 1, wherein
a plurality of the supporters is provided in a third direction perpendicular to the plane including the first and second directions, and
the workpiece is supported by the plurality of supporters.

7. The holding device according to claim 6, wherein
the plurality of supporters includes a first supporter and a second supporter, and
a distance in the third direction between the first supporter and the second supporter is changeable.

8. The holding device according to claim 7, further comprising:
a first frame mounted to the first supporter;
a second frame mounted to the second supporter;
a first protrusion fixed with respect to the first frame;
a second protrusion fixed with respect to the second frame, so that the first and second protrusions are arranged with each other in the third direction;
an engaging member including
a first groove engaging the first protrusion, and
a second groove engaging the second protrusion; and
a third actuator moving the engaging member with respect to the first and second frames,
the first actuator moving the first and second supporters in the second direction with respect to the first and second frames,
the third actuator moving the engaging member between a first engagement position and a second engagement position,
a distance in the third direction between the first protrusion and the second protrusion when the engaging member is at the first engagement position being different from the distance in the third direction between the first protrusion and the second protrusion when the engaging member is at the second engagement position,
a distance in the third direction between the first supporter and the second supporter being changed by the movement of the engaging member.

9. The holding device according to claim 7, wherein the holding device supports and grips the workpiece located on a roller conveyor including a plurality of rollers, and a spacing in the third direction between the first supporter and the second supporter is set to correspond to a spacing between mutually-adjacent rollers of the plurality of rollers.

10. A transfer system, comprising:

the holding device according to claim 1, wherein the transfer system is configured to move the holding device to transfer the workpiece.

11. The transfer system according to claim 10, further comprising:

a detector including at least one selected from a camera and a sensor and being configured to detect a position or a size of the workpiece, the transfer system being configured to move the holding device based on a detection result of the detector.

12. A holding device according to claim 1, further comprising:

a rotation part to which the supporter is fixed;

a frame to which the rotation part is rotatably mounted; and an abutment part fixed with respect to the frame, the first actuator being configured to move the rotation part with respect to the frame in the second direction and move the rotation part between a first position and a second position, the supporter protruding from the frame along the second direction at the second position, in a case where the rotation part moves from the first position to the second position, the rotation part contacts the abutment part, and a tilt of the supporter with respect to the first direction is changed by the rotation part rotating.

13. The holding device according to claim 7, wherein a plurality of the grippers is provided in the third direction, and the workpiece is gripped by the plurality of grippers.

14. The holding device according to claim 13, wherein the plurality of grippers includes a first gripper and a second supporter, and a distance in the third direction between the first gripper and the second supporter is changeable.

15. The holding device according to claim 14, wherein the distance between the first supporter and the second supporter and the distance between the first gripper and the second supporter changes synchronously.

16. A placement method, comprising:

placing a workpiece from a holding device, the holding device including a supporter being configured to support of the workpiece in a first direction, the first direction being along a vertical direction, the supporter extending along a second direction perpendicular to the first direction, a gripper including a suction pad that has a gripping surface and being configured to grip the workpiece in the second direction;

a first actuator being configured to move the supporter with respect to the gripper in the second direction, and a second actuator being configured to move the gripper in the second direction, causing a portion of the workpiece to contact a placement location by changing a tilt of the supporter in a first plane with respect to the gripping surface in a state in which the workpiece is positioned above the placement location, the first plane being parallel to the first and second directions;

moving the supporter in a direction away from the workpiece; and placing the workpiece at the placement location by releasing the gripping of the workpiece.

17. The placement method according to claim 16, wherein the supporter is tilted with respect to the second direction in a state in which a position in the second direction of a gripping portion to the workpiece is between a position in the second direction of the workpiece and a position in the second direction of a center of rotation of the supporter.

18. A transfer method, comprising:

the placement method according to claim 15 that is performed after the holding method; and a holding method that includes using the holding device to support and grip the workpiece, the holding method being performed before the placement method.

* * * * *